US009520548B2

(12) United States Patent
Fathi et al.

(10) Patent No.: US 9,520,548 B2
(45) Date of Patent: Dec. 13, 2016

(54) AMPLIFIED PIEZO ACTUATOR WITH MOTORIZED ADJUSTMENT SCREW

(71) Applicant: Thorlabs, Inc., Newton, NJ (US)

(72) Inventors: Saeed Fathi, Cambridge (GB); Mark Robson, Cambridge (GB); Keith Dhese, Cambridge (GB)

(73) Assignee: Thorlabs, Inc., Newton, NJ (US)

( * ) Notice: Subject to any disclaimer, the term of this patent is extended or adjusted under 35 U.S.C. 154(b) by 0 days.

(21) Appl. No.: 14/851,985

(22) Filed: Sep. 11, 2015

(65) Prior Publication Data

US 2016/0079512 A1    Mar. 17, 2016

Related U.S. Application Data

(60) Provisional application No. 62/050,814, filed on Sep. 16, 2014.

(51) Int. Cl.
*H01L 41/09* (2006.01)
*H01L 41/083* (2006.01)
(Continued)

(52) U.S. Cl.
CPC ............ *H01L 41/083* (2013.01); *H02N 2/043* (2013.01); *H02N 2/101* (2013.01)

(58) Field of Classification Search
CPC .......... H02N 2/04; H02N 2/043; H02N 2/046; G01P 15/0907; G01P 15/0922
(Continued)

(56) References Cited

U.S. PATENT DOCUMENTS 5,410,206 A    4/1995  Luecke et al.
6,664,710 B1  12/2003  Gottlieb et al.
(Continued)

FOREIGN PATENT DOCUMENTS

JP   H08251950 A   9/1996
RU   2007017 C1    1/1994
RU   2297078 C1    4/2007

OTHER PUBLICATIONS

International Search Report with Written Opinion, mailed Dec. 3, 2015, for corresponding international application PCT/US2015/049722.

*Primary Examiner* — Shawki S Ismail
*Assistant Examiner* — Bryan Gordon
(74) *Attorney, Agent, or Firm* — Graham Curtin, P.A.

(57) ABSTRACT

A piezoelectric actuator with integrated features to provide linear displacement of a threaded rod is presented. One mechanism provides mechanically amplified piezo motion for high speed/short travel position scanning whereas the other provides a low speed/long travel piezo motorized position adjustment. Mechanical amplifier incorporates one or more piezo stacks in longitudinal axis with preload to translate an amplified motion in the order of a few times in the transverse axis, perpendicular to the piezo stack motion. The piezo amplified output travel is transmitted to the internally threaded features of the other mechanism where a screw with a ball at the end to push a desired surface for high speed scanning mode translation. The internally threaded feature of the other mechanism is also operated by a secondary piezo stack which produces slip-stick motion steps to rotate the screw in one direction or the other to produce a slow speed/long travel mode.

8 Claims, 8 Drawing Sheets

(51) Int. Cl.
*H02N 2/04* (2006.01)
*H02N 2/10* (2006.01)

(58) Field of Classification Search
USPC .................................. 310/323.02, 328, 329
See application file for complete search history.

(56) References Cited

U.S. PATENT DOCUMENTS

| | | | | |
|---|---|---|---|---|
| 7,309,943 | B2* | 12/2007 | Henderson | G02B 7/102 |
| | | | | 310/323.02 |
| 8,482,868 | B2* | 7/2013 | Thomas | G01B 7/16 |
| | | | | 359/694 |
| 2006/0232169 | A1* | 10/2006 | Sasaki | H02N 2/025 |
| | | | | 310/329 |
| 2007/0035210 | A1* | 2/2007 | Sasaki | H02N 2/025 |
| | | | | 310/329 |
| 2007/0051190 | A1* | 3/2007 | Herhaus | G01L 1/2243 |
| | | | | 73/862.636 |
| 2009/0021118 | A1* | 1/2009 | Sasaki | H02N 2/025 |
| | | | | 310/329 |
| 2010/0038995 | A1* | 2/2010 | Claeyssen | H02N 2/025 |
| | | | | 310/323.02 |
| 2010/0115671 | A1* | 5/2010 | Pryadkin | G01B 11/03 |
| | | | | 850/1 |
| 2012/0314269 | A1 | 12/2012 | Takano et al. | |

\* cited by examiner

AMPLIFIED PIEZO ACTUATOR WITH MOTORIZED ADJUSTMENT SCREW

CROSS-REFERENCE TO RELATED APPLICATIONS

This application claims the benefit of U.S. Provisional Patent Application No. 62/050,814, filed Sep. 16, 2014, the contents of which are incorporated by reference herein. This application also relates to U.S. Provisional Application No. 62/037,997 filed on Aug. 15, 2014, the contents of which are hereby incorporated by reference.

FIELD OF THE INVENTION

The invention generally relates to piezo actuators. More particularly, the invention relates to amplified piezo actuators with a motorized adjustment screw.

BACKGROUND

Piezoelectric stacks provide a limited displacement upon excitation via a change of applied voltage. Flexure based mechanical structures have been developed to amplify the motion usually in a transverse direction to the piezo expansion in the order of a few time typically providing displacement in the order of up to 100s of microns. However, applications such as steering beams in mirror mounts, the possibility of long stroke position adjustment in the order of few millimeters as well as high frequency fine piezo driven adjustment in the order of sub-micron to a few hundreds of micros is not presented within one device. Therefore, there is a need to provide a slow/long stroke position adjustment in the same device as fast/short stroke scanning of a load.

SUMMARY

One embodiment of the invention provides an actuator, including: a threaded screw a piezo inertia driver; and a piezo amplifier; wherein the piezo inertia driver includes: a clamp having a first movable jaw for engagement with the threaded screw on a first side and a second jaw for engagement with the threaded screw on a second side opposite to said first side; and a first piezo stack mounted in said clamp for parallel movement of said first jaw element relative to said second jaw element; wherein when an alternating voltage is applied to the first piezo stack, the first piezo stack causes a parallel back-and-forth movement of the first movable jaw relative to the second jaw by expansion and contraction of the first piezo stack as a result of the applied alternating voltage; wherein the alternating voltage has a ramp up rate that is different from its ramp down rate, which causes the threaded screw to slip in the clamp more in one direction than in another direction of the back-and-forth movement, resulting in a net rotation of the threaded screw, and the rotation results in a first translation movement of the threaded screw; wherein the piezo amplifier includes: a top wall, a bottom wall, a first and second side walls, the walls being joined by flex hinges; and a second piezo stack; wherein one end of the second piezo stack is coupled to the first side wall and the other end of the second piezo stack is coupled to the second side wall; wherein the piezo inertia driver is coupled to the top wall of the piezo amplifier such that the thread screw engaged by the clamp is offset by a distance from a plane containing the first piezo stack; wherein when a second voltage is applied to the second piezo stack, the second piezo stack causes a horizontal movement of the side walls by expansion or contraction of the second piezo stack, the horizontal movement causes a perpendicular movement of the top wall via the flex hinges, and the perpendicular movement causes a second translation movement of the threaded screw by the top wall pulling or pushing the piezo inertia driver.

DETAILED DESCRIPTION OF THE PREFERRED EMBODIMENTS

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 1:
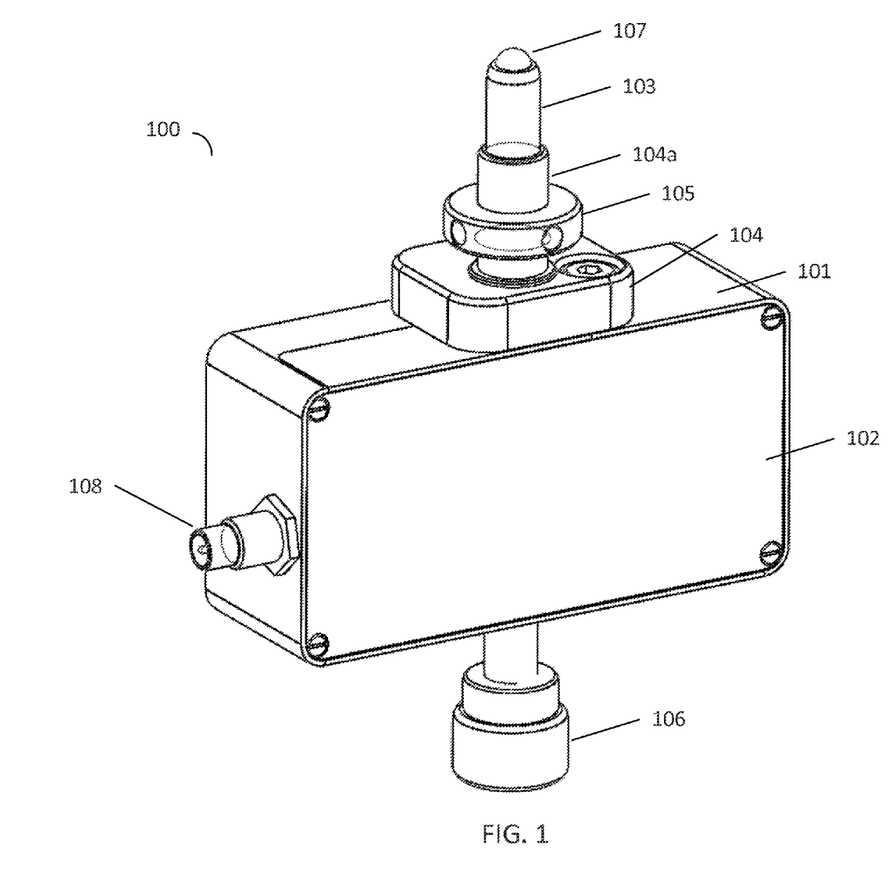
FIG. 1 illustrates a perspective view of an amplified piezo actuator according to an embodiment.

FIG. 1 illustrates an amplified piezo actuator with a motorized adjustment screw according to an embodiment. Monolithic piezo flexure housing 101 is a hardened steel structure that accommodates two wire-eroded mechanisms, each driven by one or more piezo stacks that can be driven independently. The housing 101 is covered with plates 102 in both sides and also on the top and bottom sides. The housing also accommodates and holds a threaded screw 103 (with typically 100 threads per inch) to translate motion to the moving world. The screw 103 passes through a clearance hole within a mount bracket 104 to couple the monolithic flexure housing to the application.

Figure 2:
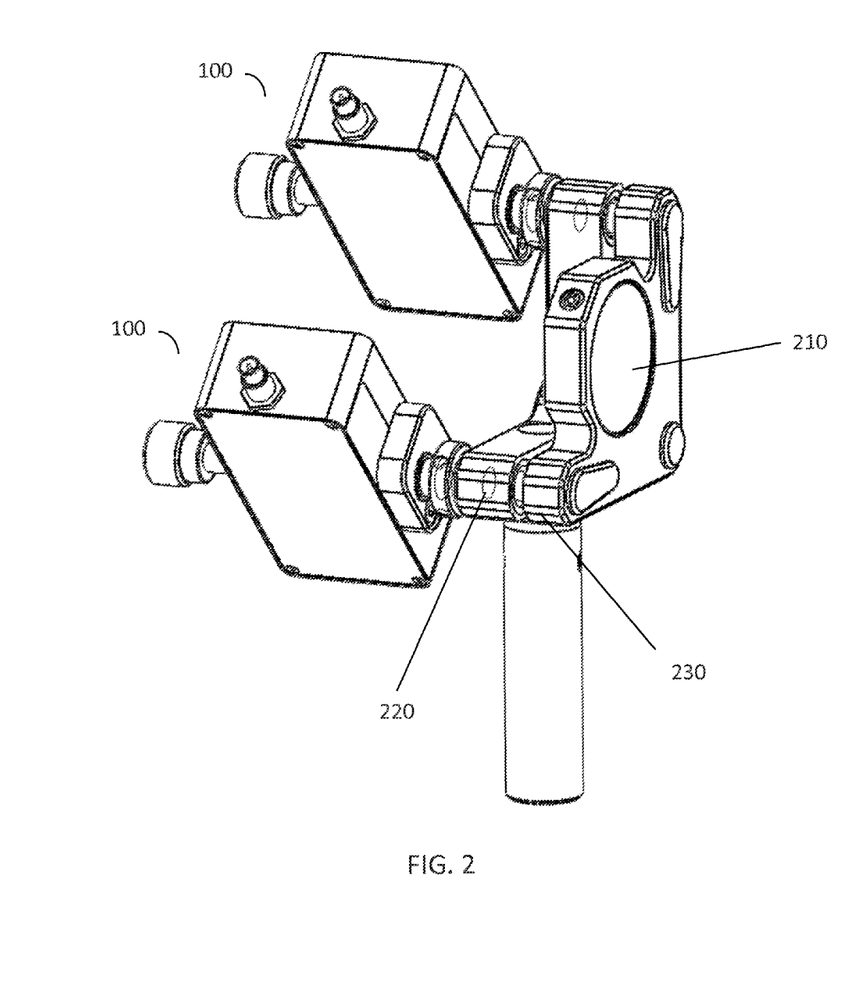
FIG. 2 illustrates an amplified piezo actuator in a typical application for steering mirrors according to an embodiment.

FIG. 2 illustrates an example application in which a couple of amplified piezo actuators 100 are attached to the fixed world 220 of a kinematic mirror mount via the external thread 104a. The threaded screw 103 is for actuating the moving world 230 of the kinematic mirror mount, so that the mirror 210 can be adjusted. The mount bracket 104 is to be set in the desired orientation and then be locked via a threaded nut 105. While the screw is engaged with features of monolithic flexure housing for a motorized adjustment, a knob 106 is also attached to one end of the screw 103 for manual rotation and so linear translation of typically a steel ball 107 at the other end of the screw for coarse adjustments. Although a steel ball is illustrated for the screw tip, other shapes, forms and/or materials for the screw tip are also contemplated. By applying and controlling the voltage to the piezo stacks within the monolithic flexure housing 101 via a connector 108 or flying lead cable, micrometer/nanometer-linear adjustment of the moving world in the application is made.

Figure 3:
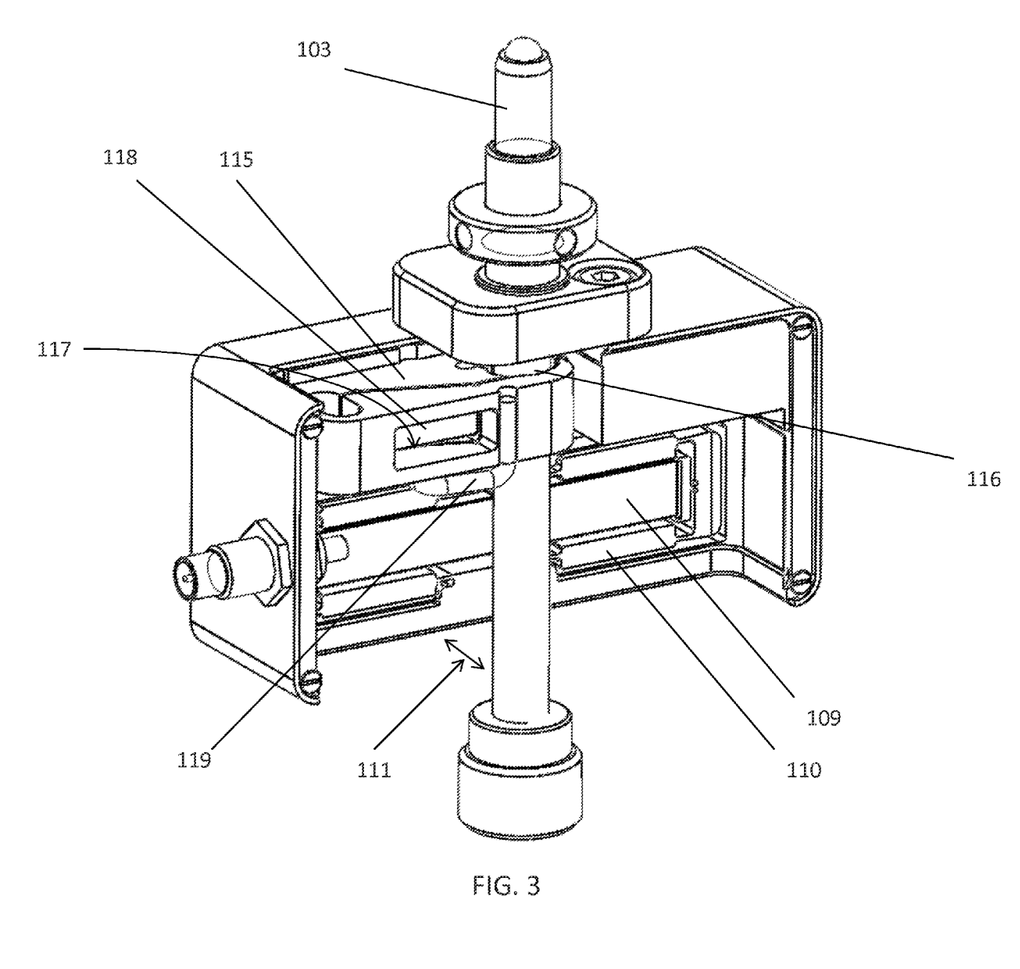
FIG. 3 illustrates a first perspective view of the internal mechanism of an amplified piezo actuator according to an embodiment.
Figure 4:
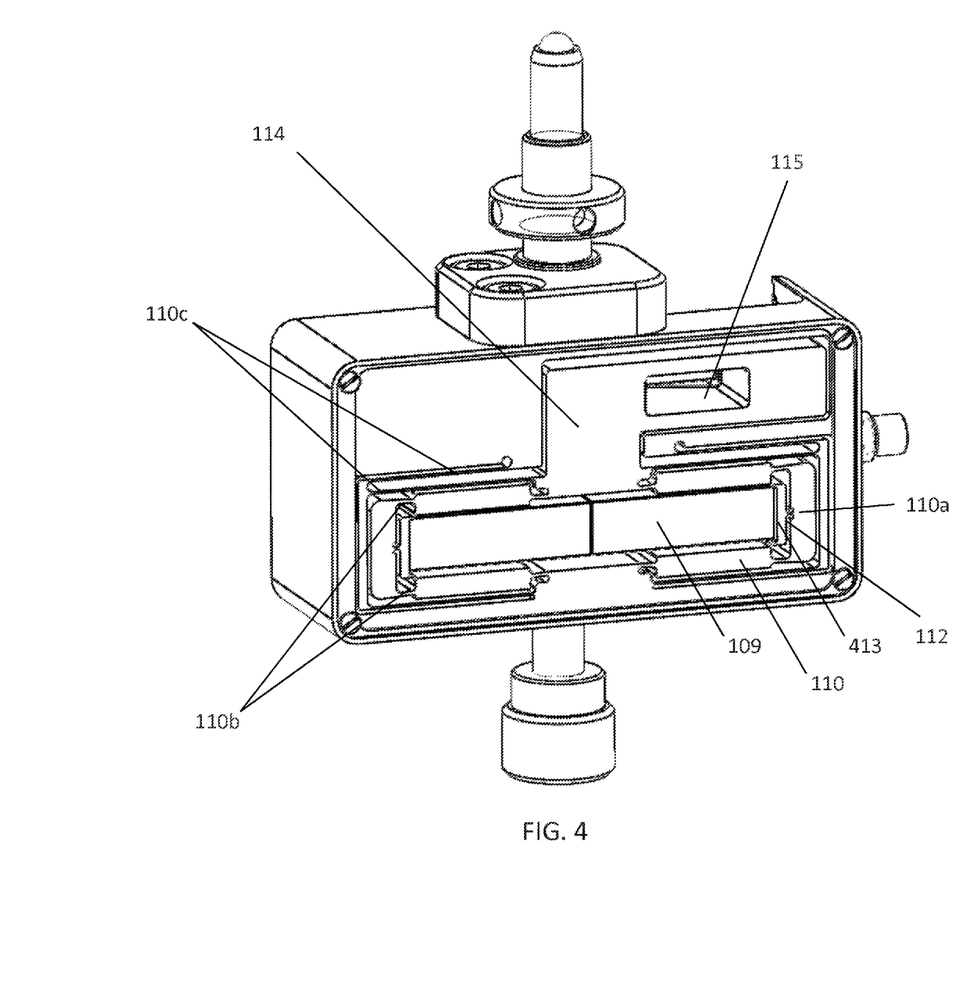
FIG. 4 illustrates a second perspective view of the internal mechanism of an amplified piezo actuator according to an embodiment.

FIGS. 3 and 4 illustrate the internal mechanism of the actuator. The mechanism of short travel/high speed scanning of the screw 103 is described as following. One of more piezo stacks 109 are fit into a mechanical amplifier flexure structure 110. The piezo stack ends sit onto end cup features 112 of the amplifier mechanism and are coupled with thin coupling interface layers 113. The coupling interface 113 at each end of the piezo stacks consists of layers of typically sub-micron to tens of micron of multiple materials including one or more aluminum, steel and also adhesive layers. These coupling layers have three functions. Aluminum layers provide a proper mechanical stress distribution on the mating surface between the ceramic piezo stack 109 and steel end cap 113. Steel layers provide a means of preloading the mechanism by opening the distance between the two end caps 113 for increasing the stiffness of the system for high frequency operation. Adhesive layers are to provide rigidity to the mechanical coupling in case of a resonance.

The mechanical amplifier mechanism 110 has flex hinges 110a, 110b and ribs 110c within the monolithic flexure housing 101. The geometries of flex hinges 110b within the amplifier mechanism 110 can be made with tight manufacturing tolerances and is crucial in providing a well maintained perpendicularity between the piezo stacks axis 109 and the screw direction. A straightness angular error between the piezo stack motion direction and the centre line between the two flex hinges 110a can be compensated via flexing the hinges 110a for both proper distribution of stress on the surface of the stack and also to avoid losing mechanical amplification factor. Anti-roll features in form of vertical and/or horizontal flex ribs 110c within the monolithic flexure housing control the planar cross-talk motion in relation to the piezo amplified displacement and also provide strength to the amplifier structure 110 when adjustment of the screw via the inertia driver 115 within the monolithic flexure housing 101 or manually via the knob 106.

By excitation of the piezo stack 109 with a change in driving voltage, the expansion of piezo stacks results in displacement of the end caps 113 and consequently an amplified displacement in the perpendicular direction (in the order of typically 10 times) is obtained due to the chosen angular orientation of the tension members and the flex hinges 110b. The amplified displacement is translated to the output feature of the amplifier 114. On the other hand, the second piezo flexure mechanism acting as a piezo inertia (slip-stick) driver 115 within the monolithic flexure housing receives amplified displacement of the first mechanism and transfer that to the screw 103 via an internal threading feature 116. The mechanical amplifier 110 can scan the screw 103 in providing a displacement pattern to typically drive a mirror in an externally closed loop optical circuit to stabilize a laser beam.

The monolithic flexure housing 101 features a second mechanism, a piezo inertia driver 115, at the same time to provide a long travel adjustment of the screw 103 independent from the first mechanism, piezo amplifier feature 110. This is made by making an offset 111 between mechanical amplifier mechanism 110 and the screw 103 engaged with the piezo inertia driver mechanism 115. The screw 103 is engaged with the internal threads 116 and is preloaded by the application being under axial reaction force.

Figure 5:
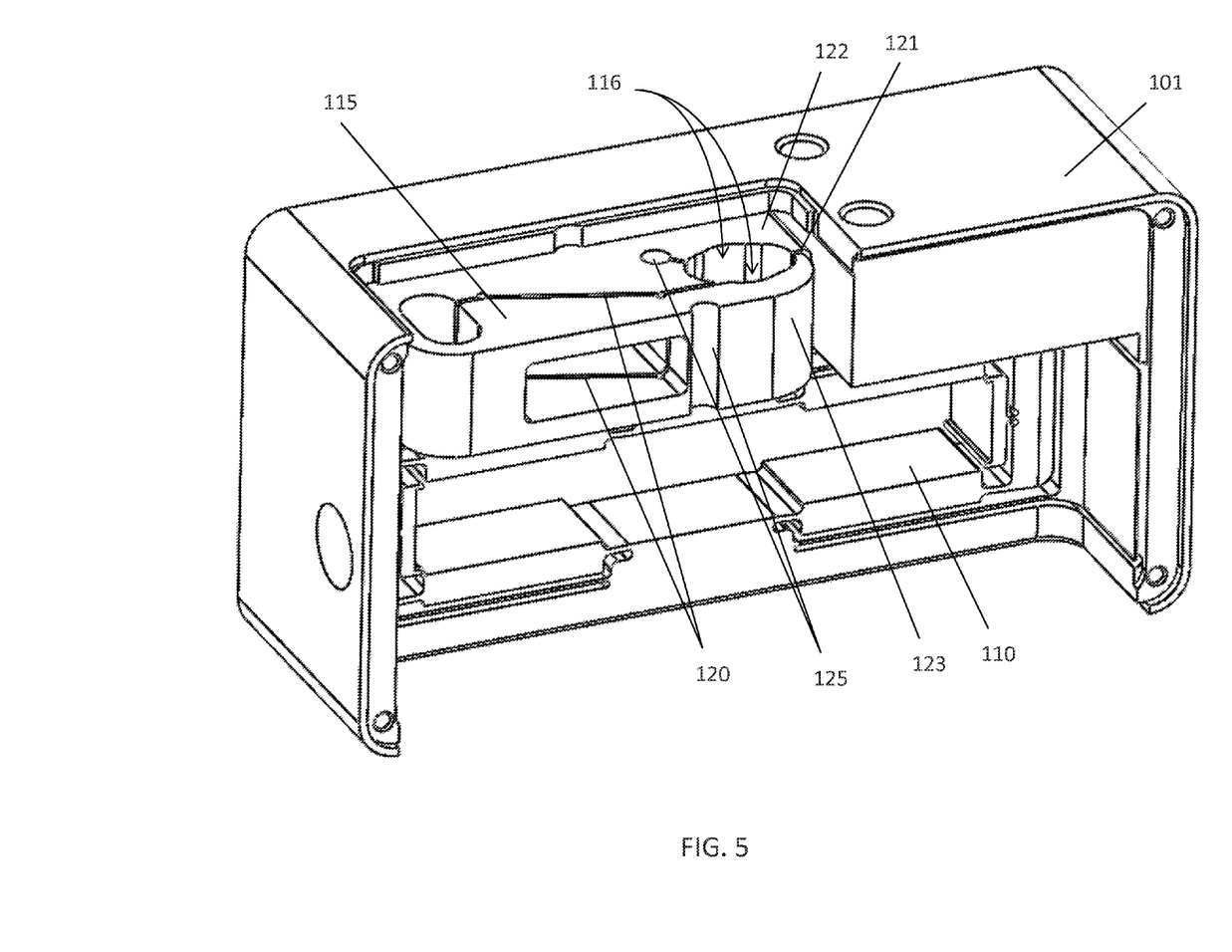
FIG. 5 illustrates a perspective view of a piezo inertia driving mechanism for motorized adjustment of screw according to an embodiment.
Figure 6:
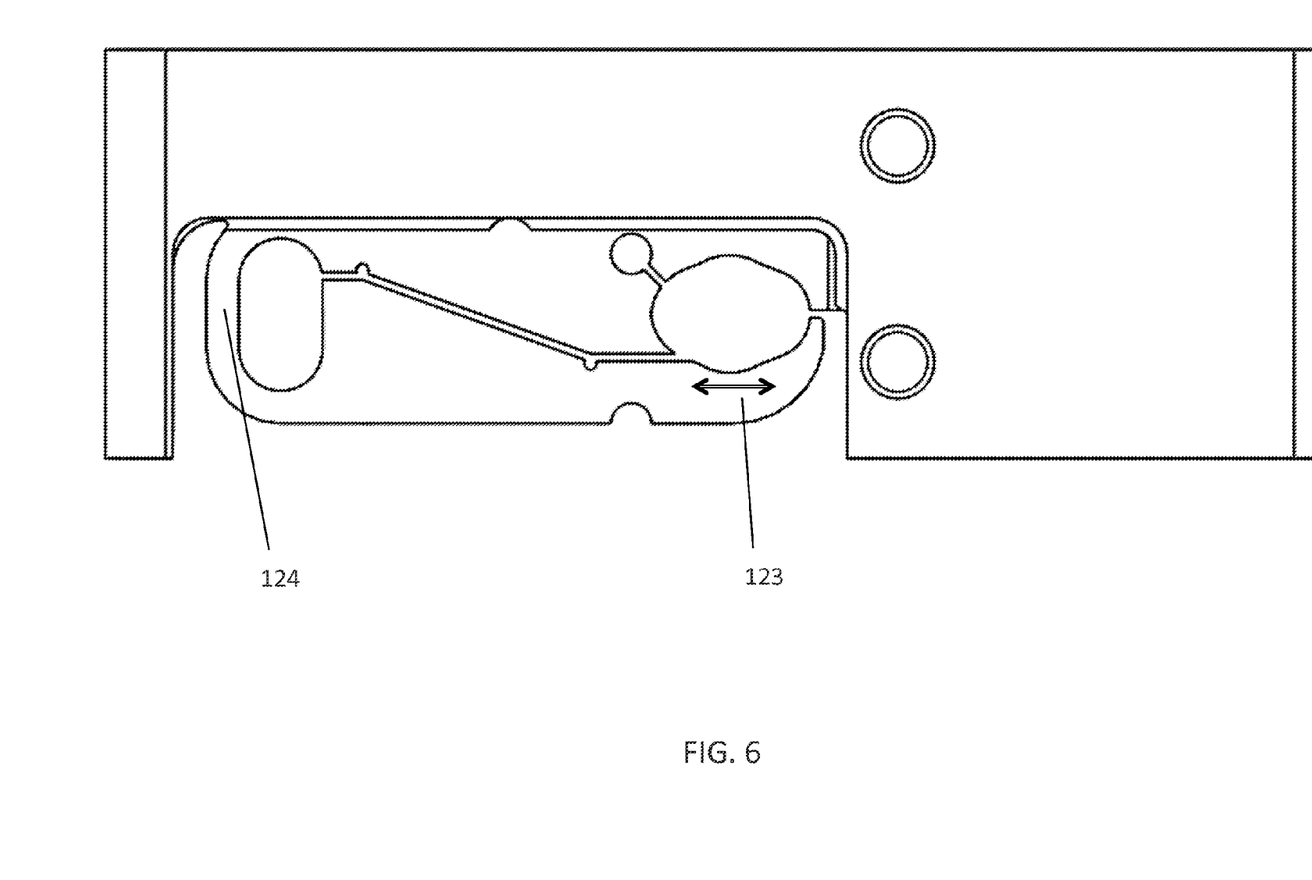
FIG. 6 illustrates a top view of a piezo inertia driving mechanism for motorized adjustment of screw according to an embodiment.

FIGS. 5 and 6 show the details of the piezo inertia driver mechanism 115 within the monolithic flexure housing 101. The piezo inertia driver mechanism 115 is similar to that of described as a standalone mechanism in U.S. Pat. No. 5,410,206. The mechanism has an opening 117 to fit a piezo 118 within its flexure structure 115 and also uses a spring 119 to firmly preload the screw 103 in the radial directions. The inertia driver mechanism 115 is made by wire-eroding the structure in a perpendicular orientation to that of amplifier mechanism 110. The wire-erosion produces a slot 120 and an opening 121 to separate two sections, fixed world 122 and moving world 123 of the inertia driver 115. The two are connected via a flexure element 124 and pull towards each other by a compression spring 119 located in the features 125 within the mechanism.

Upon a change in its driving voltage, the piezo stack 118 which is resting onto the fixed world 122 from one side and onto the moving world 123 from the other side, induces a displacement of the moving world 123 as illustrated in FIG. 6. By a slow ramp up or down of voltage from a set value and given the preload onto the screw by the spring 119, the screw rotates proportional to the translated piezo motion. This is due to the friction between the treads of screw 103 and internal threads 116 of the inertia drive mechanism 115. By a sudden return of voltage (much faster change than that of slow ramp) back to the set value, there will be a difference between the reaction time of the screw and that of moving section 123. Due to the inertia of the screw and the fast piezo return motion and a difference between static and dynamic friction coefficients in the engaged threads, a stick-slip effect is made. By this effect, there will be a small residual rotation between slow and fast ramp of the voltage profile. A well control over the voltage pulses via a waveform can produce a continuous stepping of rotational motion of the screw 103 in one direction or the other to produce linear adjustment of the application. This is independent but can be at the same time as the amplifier mechanism 110 motion. While stepping motion of the inertia drive piezo 118 can produce only a few 10s of nanometer per step and be operated at a few kilohertz, the motion translated to the screw is slow and typically a few 10s of micron per second for long travel position/hold adjustments (of 10s of millimeters) whereas the motion produced by the amplifier 110, although limited to a few 100s of microns, can be 1000s of times faster (in the order of 10s of millimeters per second), making it function for fast laser beam scanning or stabilization applications.

Figure 7:
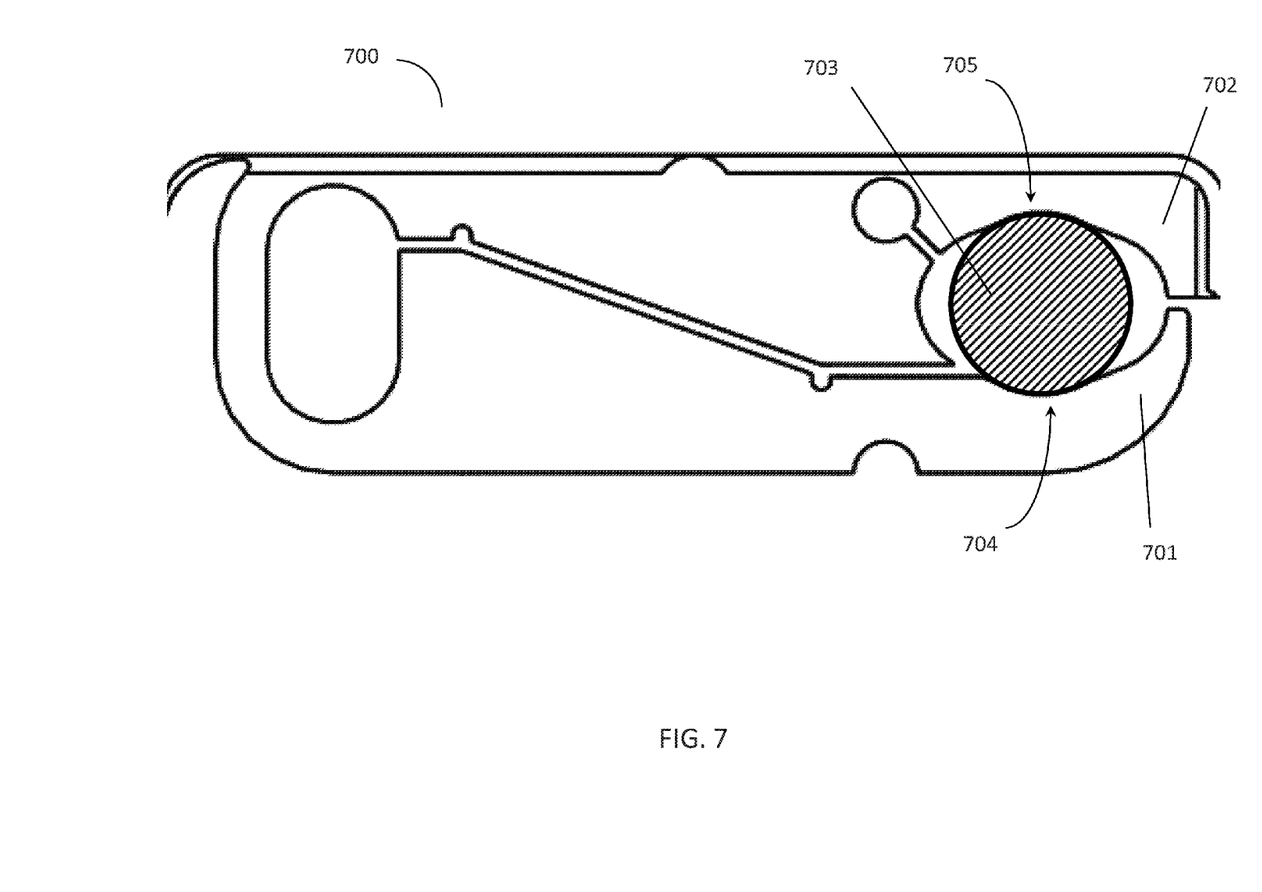
FIG. 7 illustrates an enlarged top view of a piezo inertia driving mechanism for motorized adjustment of screw according to an embodiment.
Figure 8:
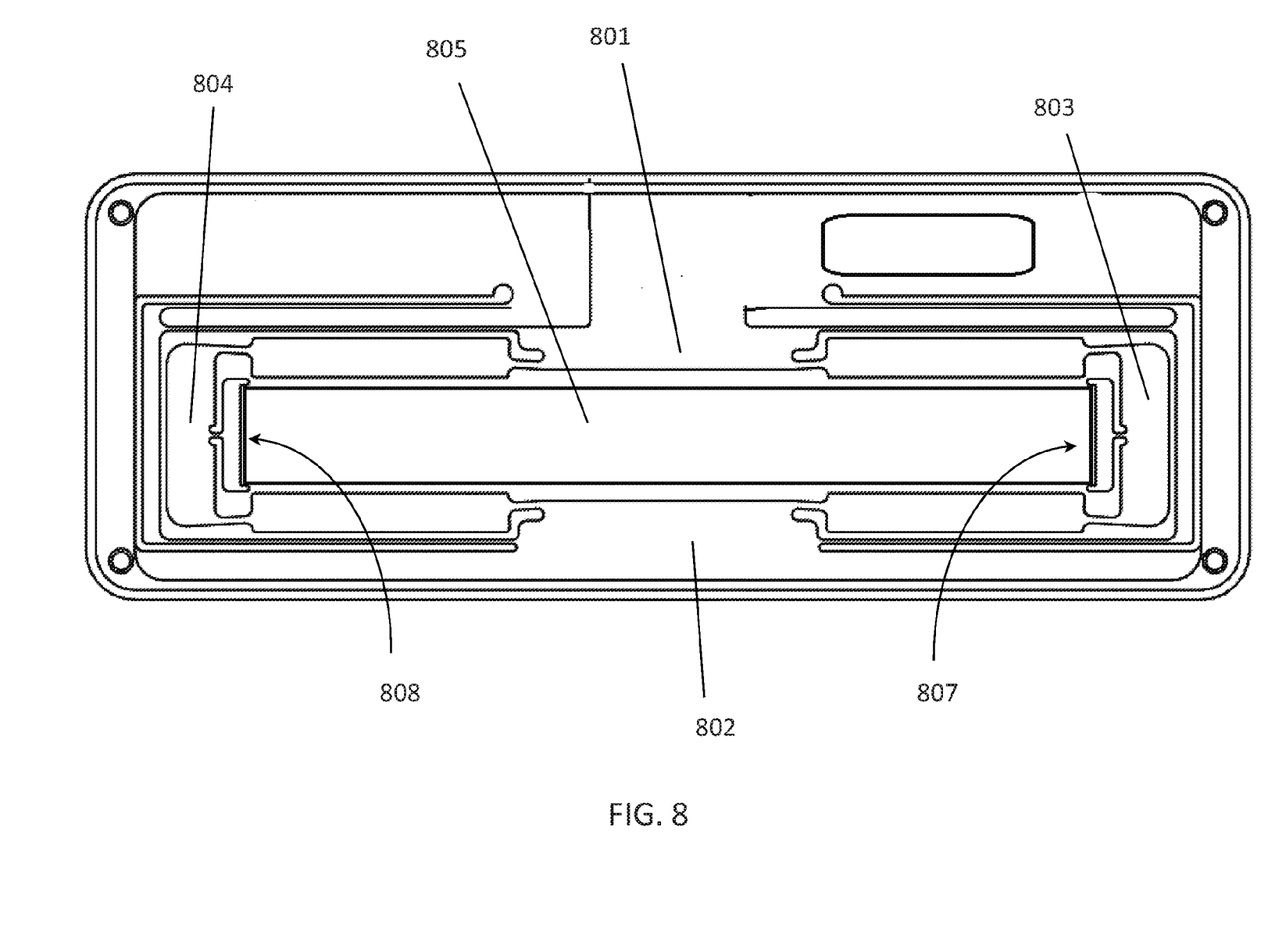
FIG. 8 illustrates a front view of the internal mechanism of an amplified piezo actuator according to an embodiment.

Further details of an embodiment are shown in FIGS. 7 and 8. FIG. 7 shows a clamp 700 having a first movable jaw 701 for engagement with the threaded screw 703 on a first side 704 and a second jaw 702 for engagement with the threaded screw 703 on a second side 705 opposite to the first side 704. FIG. 8 shows a piezo amplifier including: a top wall 801, a bottom wall 802, a first and second side walls 803, 804, the walls being joined by flex hinges; and a second piezo stack 805, with one end of the second piezo stack 807 is coupled to the first side wall 803 and the other end of the second piezo stack 808 is coupled to the second side wall 804.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. An actuator, comprising:
   a threaded screw;
   a piezo inertia driver; and
   a piezo amplifier;
   wherein the piezo inertia driver comprises:
   a clamp having a first movable jaw for engagement with the threaded screw on a first side and a second jaw for engagement with the threaded screw on a second side opposite to said first side; and
   a first piezo stack mounted in said clamp for parallel movement of said first jaw relative to said second jaw;
   wherein when an alternating voltage is applied to the first piezo stack, the first piezo stack causes a parallel back-and-forth movement of the first movable jaw relative to the second jaw by expansion and contraction of the first piezo stack as a result of the applied alternating voltage;
   wherein the alternating voltage has a ramp up rate that is different from its ramp down rate, which causes the threaded screw to slip in the clamp more in one direction than in another direction of the back-and-forth movement, resulting in a net rotation of the threaded screw, and the rotation results in a first translation movement of the threaded screw;
   wherein the piezo amplifier comprises:
   a top wall, a bottom wall, a first and second side walls, the walls being joined by flex hinges; and
   a second piezo stack;
   wherein one end of the second piezo stack is coupled to the first side wall and the other end of the second piezo stack is coupled to the second side wall;
   wherein the piezo inertia driver is coupled to the top wall of the piezo amplifier such that the thread screw engaged by the clamp is offset by a distance from a plane containing the first piezo stack;
   wherein when a second voltage is applied to the second piezo stack, the second piezo stack causes a horizontal movement of the side walls by expansion or contraction of the second piezo stack, the horizontal movement causes a perpendicular movement of the top wall via the flex hinges, and the perpendicular movement causes a second translation movement of the threaded screw by the top wall pulling or pushing the piezo inertia driver.

2. The actuator of claim 1, wherein the tip of the screw comprises a steel ball.

3. The actuator of claim 1, wherein each of the first and second side walls comprises an end cup for coupling with the second piezo stack, each of the first and second side walls being connected to its end cup via a flex hinge.

4. The actuator of claim 1, wherein each of the first and second side walls comprises a coupling interface for coupling with the second piezo stack, and the coupling interface comprises a plurality of layers including one or more aluminum, steel and adhesive layers.

5. The actuator of claim 1, further comprising a spring to pull the first and second jaws together in order to preload the threaded screw.

6. The actuator of claim 1, further comprising a circuit for providing the alternating voltage.

7. The actuator of claim 1, wherein the jaws are partially threaded.

8. The actuator of claim 1, wherein the piezo inertia driver and the piezo amplifier are parts of a monolithic structure.

* * * * *